US008351942B2

(12) United States Patent
Wang et al.

(10) Patent No.: US 8,351,942 B2
(45) Date of Patent: Jan. 8, 2013

(54) SIGNALING METHOD TO SUPPORT GEO-LOCATION EMERGENCY SERVICES

(75) Inventors: Liwa Wang, Morris Plains, NJ (US); Pengfei Zhu, Morris Plains, NJ (US)

(73) Assignee: Alcatel Lucent, Paris (FR)

( * ) Notice: Subject to any disclaimer, the term of this patent is extended or adjusted under 35 U.S.C. 154(b) by 1209 days.

(21) Appl. No.: 11/986,799

(22) Filed: Nov. 27, 2007

(65) Prior Publication Data

US 2008/0233916 A1 Sep. 25, 2008

Related U.S. Application Data

(60) Provisional application No. 60/919,244, filed on Mar. 21, 2007.

(51) Int. Cl.
*H04W 36/00* (2009.01)

(52) U.S. Cl. .................. 455/436; 370/331; 370/519

(58) Field of Classification Search ............... 455/404.2, 455/436
See application file for complete search history.

(56) References Cited

U.S. PATENT DOCUMENTS

| 2002/0141360 | A1* | 10/2002 | Baba et al. | 370/331 |
| 2004/0120286 | A1* | 6/2004 | Schwarz | 370/331 |
| 2004/0258012 | A1* | 12/2004 | Ishii | 370/328 |
| 2005/0192011 | A1* | 9/2005 | Hong et al. | 455/440 |
| 2007/0298806 | A1* | 12/2007 | Venkatachalam | 455/450 |

FOREIGN PATENT DOCUMENTS

| WO | 9909778 A | 2/1999 |
| WO | 9959373 A | 11/1999 |
| WO | 2004105273 A | 12/2004 |

OTHER PUBLICATIONS

International Search Report for PCT/US2008/003502 dated Aug. 7, 2008.
Silventoinen M I, et al., "Mobile Station Emergency Locating in GSM", Personal Wireless Communications, 1996, pp. 19-21, Feb. 19, 1996, New York, New York, USA.
TIA/EIA Interim Standard, Release B, Part 1: Overview, May 2002.
TIA/EIA Interim Standard, Release B, Part 2: Transport, May 2002.
TIA/EIA Interim Standard, Release B, Part 3: Features, May 2002.
TIA/EIA Interim Standard, Release B, Part 4: (A1, A2, and A5 Interfaces), May 2002.
TIA/EIA Interim Standard, Release B, Part 5: (A3, and A7 Interfaces), May 2002.
TIA/EIA Interim Standard, Release B, Part 6: (A8 and A9 Interfaces), May 2002.
TIA/EIA Interim Standard, Release B, Part 7: (A10 and A11 Interfaces), May 2002.

* cited by examiner

*Primary Examiner* — Marcos Batista
(74) *Attorney, Agent, or Firm* — McCormick, Paulding & Huber LLP

(57) ABSTRACT

In a method to support geo-location emergency services in a wireless network, a request message is transmitted from a source base station of one vendor to a target base station of another vendor. For example, the request message might be sent subsequent to a wireless unit initiating an emergency services communication, where it is desired to determine the location of the wireless unit by radiolocation, or otherwise at the network level. Upon receiving the request message, the target base station transmits a report message to the source base station, which includes a one-way transmission delay (or other propagation delay information) of the wireless unit as measured at the target base station. Communication protocols in the network are configured so that there are no automatic transmissions of propagation delay information. Instead, base stations transmit propagation delay information only upon the receipt of request messages requesting the information.

25 Claims, 5 Drawing Sheets

| PROPAGATION DELAY MEASUREMENT REQUEST | | | | |
|---|---|---|---|---|
| Information Element | Section Reference | Element Direction | Type | |
| Message Type II | 4.2.1 | SDU --> BTS | M | |
| Call Connection Reference | 4.2.23 | SDU --> BTS | O | R |
| Correlation ID | 4.2.26 | SDU --> BTS | O | C |
| Propagation Delay Request Record | 4.2.63 | SDU --> BTS | O | R |

3.1.23 PROPAGATION DELAY MEASUREMENT REQUEST

| 7 | 6 | 5 | 4 | 3 | 2 | 1 | 0 | Octet |
|---|---|---|---|---|---|---|---|---|
| ⇒ Message Type II = [05H] ||||||||  1 |
| ⇒ Call Connection Reference: A3/A7 Element Identifier = [3FH] |||||||| 1 |
| Length = [08H] |||||||| 2 |
| (MSB) | Market ID = <any value> ||||||| 3 |
|  |  |  |  |  |  |  | (LSB) | 4 |
| (MSB) | Generating Entity ID = <any value> ||||||| 5 |
|  |  |  |  |  |  |  | (LSB) | 6 |
| (MSB) | Call Connection Reference = <any value> ||||||| 7 |
|  |||||||| 8 |
|  |||||||| 9 |
|  |  |  |  |  |  |  | (LSB) | 10 |
| ⇒ Propagation Delay Request Record: A3/A7 Element Identifier = [C0H] |||||||| 1 |
| Length = [08H] |||||||| 2 |
| Cell Identification Discriminator = [07H] |||||||| 3 |
| (MSB) | MSCID = <any value> ||||||| 4 |
|  |||||||| 5 |
|  |  |  |  |  |  |  | (LSB) | 6 |
| (MSB) | Cell = [001H-FFFH] ||||||| 7 |
|  |  |  |  | (LSB) | Sector = [0H-FH] (0H = Omni) ||| 8 |

FIG. 3B

4.2.63 PROPAGATION DELAY REQUEST RECORD

| 7 | 6 | 5 | 4 | 3 | 2 | 1 | 0 | Octet |
|---|---|---|---|---|---|---|---|---|
| A3/A7 Element Identifier |||||||| 1 |
| Length |||||||| 2 |
| Cell Identification Discriminator |||||||| 3 |
| Cell Identification |||||||| Var |

FIG. 3C

| PROPAGATION DELAY MEASUREMENT REPORT —26 |||||
|---|---|---|---|---|
| Information Element | Section Reference | Element Direction | Type ||
| Message Type II | 4.2.1 | BTS --> SDU | M ||
| Call Connection Reference | 4.2.23 | BTS --> SDU | O | R |
| Correlation ID | 4.2.26 | BTS --> SDU | O | R |
| One Way Propagation Delay Record | 4.2.28 | BTS --> SDU | O | R |

FIG. 4A

| ONE WAY PROPAGATION DELAY RECORD —84 ||||||||| |
|---|---|---|---|---|---|---|---|---|
| 7 | 6 | 5 | 4 | 3 | 2 | 1 | 0 | Octet |
| A3/A7 Element Identifier |||||||| 1 |
| Length |||||||| 2 |
| Cell Identification Discriminator |||||||| 3 |
| (MSB) | Cell Identification ||||||| 4 |
| Cell Identification ||||||| (LSB) | m |
| | | | | | | | | |
| (MSB) | CDMA Serving One Way Delay ||||||| m+1 |
| | | | | | | | (LSB) | m+2 |
| (MSB) | CDMA Serving One Way Delay Time Stamp ||||||| m+3 |
| | | | | | | | (LSB) | m+4 |

FIG. 4C

| | 7 | 6 | 5 | 4 | 3 | 2 | 1 | 0 | Octet |
|---|---|---|---|---|---|---|---|---|---|
| | \multicolumn{8}{c|}{PROPAGATION DELAY MEASUREMENT REPORT MESSAGE — 26} | |
| 78 | 7 | 6 | 5 | 4 | 3 | 2 | 1 | 0 | Octet |
| 80 | ⇒ Message Type II = [06H] | | | | | | | | 1 |
| | ⇒ Call Connection Reference: A3/A7 Element Identifier = [3FH] | | | | | | | | 1 |
| | Length = [08H] | | | | | | | | 2 |
| | (MSB) | Market ID = <any value> | | | | | | | 3 |
| | | | | | | | | (LSB) | 4 |
| | (MSB) | Generating Entity ID = <any value> | | | | | | | 5 |
| | | | | | | | | (LSB) | 6 |
| | (MSB) | Call Connection Reference = <any value> | | | | | | | 7 |
| | | | | | | | | | 8 |
| | | | | | | | | | 9 |
| 84 | | | | | | | | (LSB) | 10 |
| | ⇒ One Way Propagation Delay Record: A3/A7 Element Identifier = [09H] | | | | | | | | 1 |
| | Length = [08H] | | | | | | | | 2 |
| | Cell Identification Discriminator = [07H] | | | | | | | | 3 |
| | (MSB) | MSCID = <any value> | | | | | | | 4 |
| | | | | | | | | | 5 |
| | | | | | | | | (LSB) | 6 |
| | (MSB) | Cell = [001H-FFFH] | | | | | | | 7 |
| 28 | | | | (LSB) | Sector = [0H-FH] (0H = Omni) | | | | 8 |
| | (MSB) | CDMA Serving One Way Delay = [0000H-FFFFH] (x1/8th PN chip) | | | | | | | 9 |
| 62 | | | | | | | | (LSB) | 10 |
| | (MSB) | CDMA Serving One Way Delay Time Stamp | | | | | | | 11 |
| | | | | | | | | (LSB) | 12 |

FIG. 4B

SIGNALING METHOD TO SUPPORT GEO-LOCATION EMERGENCY SERVICES

This application claims the benefit of U.S. Provisional Application Ser. No. 60/919,244, filed Mar. 21, 2007, which is hereby incorporated by reference herein in its entirety.

FIELD OF THE INVENTION

The present invention relates to wireless communications and, more particularly, to soft handoff in the context of geo-location services.

BACKGROUND OF THE INVENTION

In a typical radio frequency ("RF") communication network, data and other signals are transmitted from one or more fixed base stations to one or more wireless units. Because most wireless units are carried between different locations, e.g., home, car, and work, the distance between a wireless unit and each of a network's base stations will typically vary over time. As the wireless unit moves away from one base station and towards another, because the wireless unit has a limited range, it may be necessary to transfer support of the wireless units between the two base stations. This process is referred to as "handoff." Handoff occurs when primary control of a call has to be transferred from one base station to another as the user moves between cells. In a traditional, "hard" handoff, the connection to the current, "source" base station is broken, and then the connection to the new, "target" base station is made. If all the base stations in a CDMA-based network use the same frequency bandwidths, however, it is possible to make the connection to the new base station without breaking the connection to the current base station. (Each base station with a connection to the wireless unit is referred to as a "call leg" or "leg.") This is known as "soft" handoff. Soft handoff requires less power, which reduces interference and increases capacity.

Because of their widespread, near ubiquitous use, wireless units are regularly used to initiate emergency services, e.g., calls to 911, direct calls to emergency service providers, or the like. Unlike landline telephones, however, where the location of the telephone unit is static (at least within the context of a designated address or other location), the locations of most wireless units are variable. Some wireless units are provided with location devices (e.g., GPS) for providing information to the network about the current location of the wireless unit, for use by emergency responders in locating the wireless unit in an emergency situation. For wireless units without such location devices, or for situations where the location device or system is malfunctioning, it is desirable for the network itself to determine the location of the wireless units.

One such method involves calculating the distance of a wireless unit from a base station based on the wireless unit's signal propagation delay (e.g., the time it takes for a signal to travel from the wireless unit to the base station), which is possible because the dependency between signal propagation time and distance is linear. Use of this method may require propagation delay values from different base stations operated by different network vendors, for triangulation purposes. Current communication standards, however, do not allow for the collation of this information at a source base station at the particular time when an emergency service request is initiated at a wireless unit. Instead, propagation delay information is automatically transmitted from a target base station of one vendor to a source base station of another vendor only in the following instances: (i) immediately following the target base station's acquisition of the wireless unit; and (ii) when the propagation delay measured at the target base station changes by more than a designated amount. In most cases, these instances will not correspond to when an emergency service request is initiated, leaving the source base station "blind" as to the propagation delay of the wireless unit at the target base station(s). This may result poor quality or malfunctioning emergency service communications in the wireless network.

SUMMARY OF THE INVENTION

An embodiment of the present invention relates to a method and system for communicating in a wireless network, e.g., a signaling method to support geo-location emergency services in the network. According to the method, a request message is transmitted from a source base station to a target base station. For example, the request message might be sent after a wireless unit initiates an emergency services communication, if network-level radiolocation of the wireless unit is desired. (As indicated above, "target" and "source" refer to base stations in communication with the wireless unit during handoff, or otherwise associated with the wireless unit for handoff purposes. Additionally, by "wireless unit" it is meant, for example, mobile phones, wireless PDA's, wireless devices with high-speed data transfer capabilities, such as those compliant with "3-G" or "4-G" standards, "WiFi"-equipped computer terminals, and the like.) Upon receiving the request message, the target base station transmits a report message to the source base station. The report message includes propagation delay information associated with the wireless unit, e.g., a CDMA one-way transmission delay of the wireless unit as measured at the target base station.

In another embodiment, communication protocols in the wireless network are configured so that base stations transmit propagation delay information only upon the receipt of request messages requesting the propagation delay information. Thus, there are no automatic transmissions in the network of propagation delay information, either upon a base station acquiring a wireless unit or when the wireless unit's propagation delay changes. Since propagation delay information is transmitted only when required, this results in a reduction of bandwidth usage in the network.

The aforementioned method is particularly beneficial in situations where the target base station and the source base station are operated by different vendors, that is, by different, unrelated companies. In particular, unlike in conventional networks, the communications method of the present invention provides a mechanism for the source base station of one vendor to request a wireless unit's propagation delay information from a target base station of another vendor at any time when a geo-location emergency service is needed, e.g., when an emergency services-related communication is initiated that requires or warrants a network-based determination of wireless unit location.

BRIEF DESCRIPTION OF THE DRAWINGS

The present invention will be better understood from reading the following description of non-limiting embodiments, with reference to the attached drawings, wherein below:

FIG. 1 is a schematic diagram of a signaling method to support geo-location emergency services in a wireless network, according to an embodiment of the present invention;

FIGS. 3A-3C are tables showing the format of one embodiment of a propagation delay measurement request message; and FIGS. 4A-4C are tables showing the format of one embodiment of a propagation delay measurement report message.

DETAILED DESCRIPTION

Figures 1, 3A:
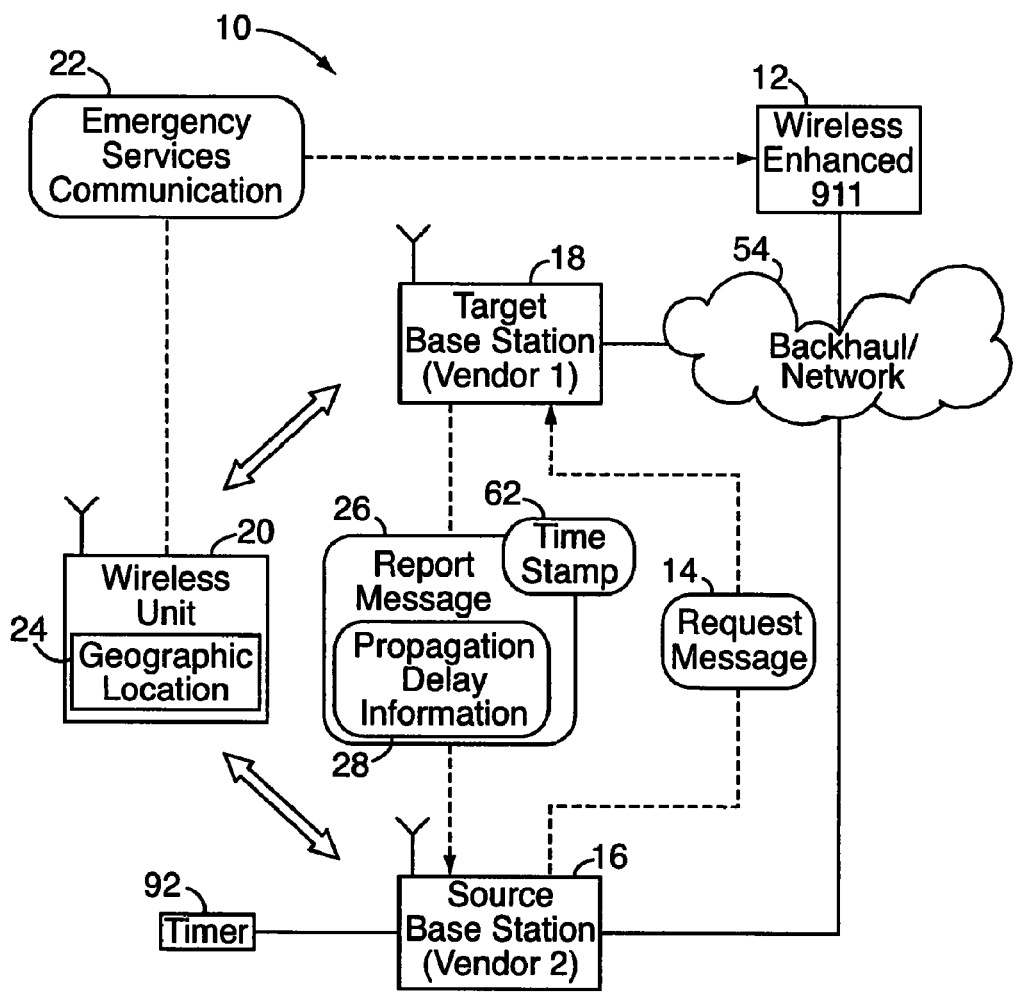

With reference to FIGS. 1-4C, an embodiment of the present invention relates to a method and system for communicating in a wireless network 10, e.g., a signaling method to support geo-location emergency services 12 in the network. According to the method, a request message 14 is transmitted from a source base station 16 to a target base station 18. For example, the request message 14 might be sent subsequent to a wireless unit 20 initiating an emergency services communication 22, if it is desired to determine the location 24 of the wireless unit. Upon receiving the request message 14, the target base station 18 transmits a report message 26 to the source base station 16. The report message 26 includes propagation delay information 28 associated with the wireless unit, e.g., a one-way transmission delay of the wireless unit as measured at the target base station. The propagation delay information 28 may be used as part of a process for determining the location of the wireless unit through radiolocation, using the network's RF infrastructure.

Communication protocols in the network 10 are configured so that base stations 16, 18 transmit propagation delay information 28 only upon the receipt of request messages 14 requesting the propagation delay information. Thus, in the network 10 there are no automatic transmissions of propagation delay information, either upon a base station acquiring a wireless unit or when the wireless unit's propagation delay changes. Since propagation delay information is transmitted only when required, this results in a reduction of bandwidth usage in the network.

The method of the present invention is particularly applicable to situations where different vendors (i.e., unrelated companies) operate the target base station 18 and the source base station 16. In particular, unlike in conventional networks, the communications method of the present invention provides a mechanism for the source base station 16 of one vendor to request a wireless unit's propagation delay information 28 from a target base station 18 at any time when a geo-location emergency service 12 is needed, that is, when an emergency services-related communication 22 is initiated that requires or warrants a network-based determination of wireless unit location 24.

Figure 2:
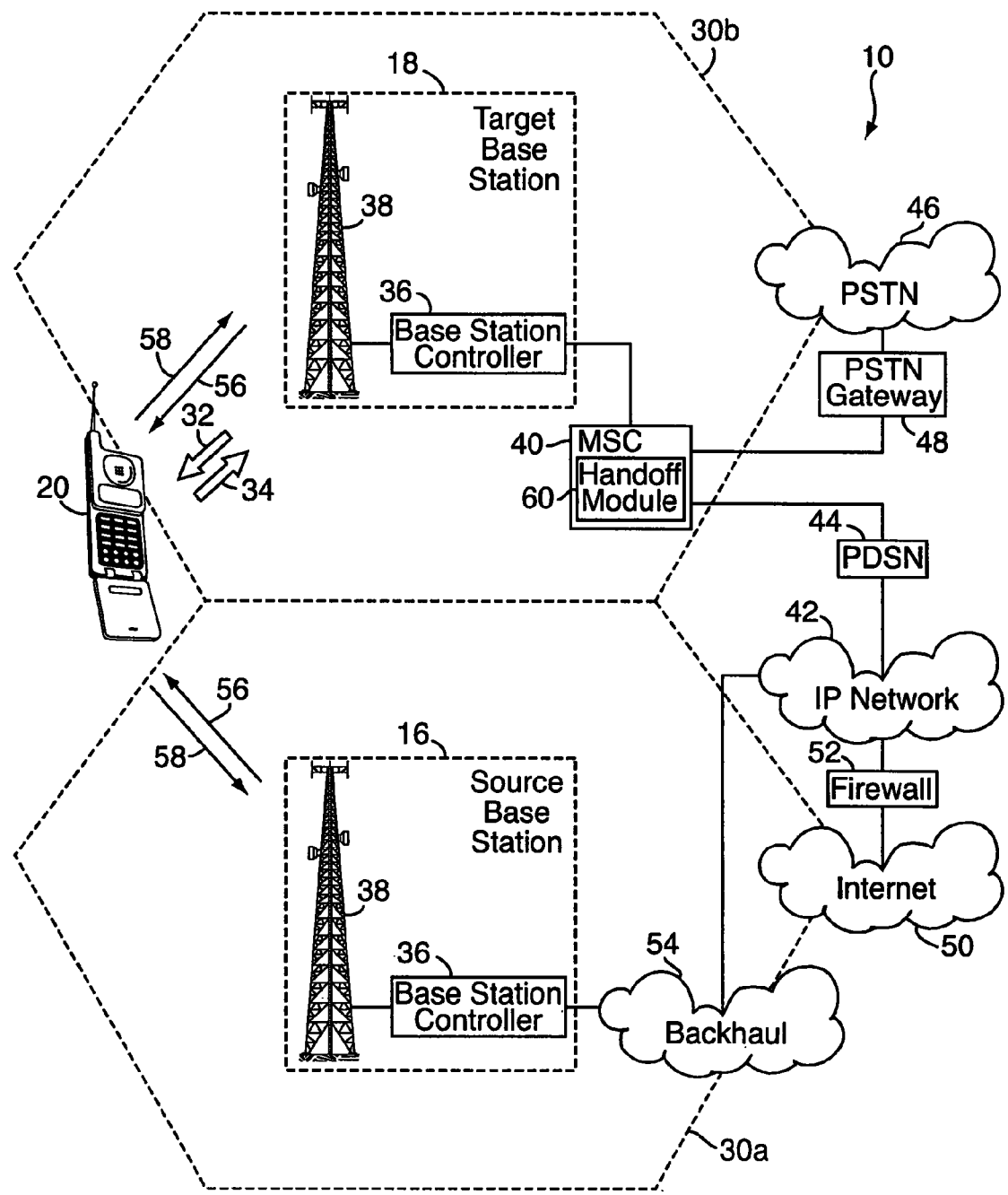
FIG. 2 is a schematic diagram of a wireless communication network.

With reference to FIG. 2, the wireless network 10 may be of the type using a CDMA (code division multiple access) spread-spectrum multiplexing scheme, e.g., a 1x-EVDO network, to carry out wireless communications between base stations and wireless units. The network 10 is geographically divided into a number of contiguous cells 30a, 30b, each serviced by a stationary base station 16, 18, and/or into sectors, which are portions of a cell typically serviced by different antennae/receivers supported on a single base station. Transmissions from the base stations 16, 18 to the wireless units 20 are across a first frequency bandwidth known as the forward link 32. Transmissions from the wireless units to the base stations are across a second frequency bandwidth known as the reverse link 34. Generally, each wireless unit is allocated the entire bandwidth all the time, with the signals from individual wireless units being differentiated from one another using an encoding scheme. The forward and reverse links may each comprise a number of physical or logical traffic channels and signaling/control channels, the former primarily for carrying voice data, and the latter primarily for carrying the control, synchronization, and other signals required for implementing CDMA or other communication schemes. If the network is a 1x-EVDO (Evolution Data Optimized, or Evolution Data Only) wireless communication network, many of which are now implemented in many parts of the U.S. and elsewhere, it will use the CDMA2000® 3-G mobile telecommunications protocol/specification for the high-speed wireless transmission of both voice and non-voice data. 1x-EVDO is an implementation of CDMA2000® that supports high data rates, specifically, forward link data rates of at least 3.1 Mbit/s, and reverse link rates of at least 1.8 Mbit/s in a radio channel dedicated to carrying high-speed packet data, e.g., a 1.25 or greater MHz-bandwidth radio channel separate from the radio channel for carrying voice data.

The base stations 16, 18 each have a base station controller 36 and various transceivers and antennae 38 for radio communications with the wireless units 20. The wireless units 20 may include, for example, mobile phones, wireless PDA's, wireless devices with high-speed data transfer capabilities, such as those compliant with "3-G" or "4-G" standards, "WiFi"-equipped computer terminals, and the like. Additionally, the network 10 includes a radio network controller and/or mobile switching center ("MSC") 40. The MSC 40 interconnects the base stations and performs the signaling functions necessary to establish calls and other data transfer to and from the wireless units 20. It also acts as the interface between the wireless/radio end of the network 10 and the rest of the network. For example, the MSC 40 may be connected to an Internet protocol ("IP")-based network or other core packet data network 42, by way of a packet data serving node ("PDSN") 44. The MSC 40 may also be connected to a public switched telephone network ("PSTN") 46 through a PSTN gateway 48, which allows the wireless units 20 to access PSTN services such as originating and receiving PSTN calls, e.g., calls to public landline phones. The core data network 42 is used for the long distance wire-line transmission of packet data, and/or to interconnect the MSC 40 with other mobile switching centers and with additional network components such as a network AAA (authentication, authorization, and accounting) module, not shown. The network 10 may also be connected to a public packet data network 50 (e.g., the Internet) through a security firewall 52 or the like. For high-speed data transmission across the packet data networks 42, 50 (e.g., for facilitating web browsing, real time file transfer, or downloading large data files), the network 10 may use the Internet Protocol ("IP"), where data is broken into a plurality of addressed data packets. Additionally, VoIP (voice over IP) may be used for voice-data transmission. (With VoIP, analog audio signals are captured, digitized, and broken into packets like non-voice data.) Both voice and non-voice data packets are transmitted and routed over the wireless network 10, where they are received and reassembled by the wireless units 20 to which the data packets are addressed.

Although only one MSC 40 is shown in FIG. 2, the overall network 10 will typically include more than one MSC, especially in cases involving base stations operated by different vendors. For example, if the target base station 18 is operated by a first vendor and the source base station 16 is operated by a second vendor, then the source base station 16 will typically be connected to an MSC operated by the second vendor and/or to other upstream vendor-specific network elements, which are referred to collectively in FIG. 2 as backhaul 54.

As part of the process for carrying out ongoing communications over the network 10, each base station 16, 18 typically transmits a pilot signal 56 over the forward link 32. The pilot signals 56 may be used for signal strength comparisons between base stations, as part of the call handoff procedure. For each wireless unit 20, the pilot signals are received by the wireless unit 20, which subsequently periodically measures one or more characteristics of the pilot signals using standard hardware/software built into the wireless unit for that purpose. The quality or characteristic may be a pilot signal strength-to-interference ratio "Ec/Io," a gross power in milliwatts or dBm, or the like. Subsequently, the wireless unit 20 generates one or more signal quality or other feedback messages 58, which are transmitted back to the base stations 16, 18. The feedback messages 58 may include signal quality information about each pilot signal received by the mobile station, namely, information that identifies the base station from which the pilot signal originated (which is determined from the encoding of the pilot signal), and a quality descriptor or other information that conveys the measured quality or characteristic, or some pre-specified function of it, of the received pilot signal. (Other information may also be provided.) A separate feedback message may be generated for each pilot signal, or a single message may be generated containing information for all the pilot signals.

Once the forward link feedback information 58 is received at the base stations from the wireless unit 20, it is used for controlling soft handoff or hard handoff. For example, feedback data relating to pilot signal strength as measured by the wireless unit 20 may be routed to a handoff module or controller 60 in place on the MSC 40. The handoff module 60 maintains a record or other data listing for each wireless unit 20 actively linked to the network. The data listing for a wireless unit 20 contains an active set for the wireless unit, which is a listing of the base stations or legs temporarily associated with the wireless unit 20 for soft handoff purposes. (In the context of handoff, a base station is usually referred to as a leg or active leg, e.g., as in a leg or segment of the handoff.) The listing of each leg in the active set may include the pilot signal strength of the leg, as provided by the wireless unit 20. The data listing for each wireless unit may comprise solely the active set of the wireless unit, or possibly additional information. Legs may be added to and removed from the active set in a standard manner. For example, if the strength of the forward link pilot signal transmitted by a base station rises about a threshold value, the base station may be added to the active set. Data traffic intended for the wireless unit may be routed to each base station included in the active set for concurrent transmission to the wireless unit. Typically, the wireless unit is provided with information from the base station(s) and/or MSC, e.g., in a handoff direction message or the like, for informing the wireless unit of which base stations are in the active set.

In the most general context of the present invention, the designations "target" base station and "source" base station are arbitrary, and refer to any base stations associated with a wireless unit in a handoff situation, e.g., the base stations are included in the active set for the wireless unit. In a more specific case, the target base station is a base station to be added to the active set, or one that is newly added to the active set, whereas the source base station is a base station already on the active set. Alternatively, in a more narrow case, the source base station may be the primary base station on the active list, whereas the target base station is a secondary base station on the active list. (In some networks, "primary" and "secondary" are terminologies for the source and target base stations in soft handoff.) In the narrowest sense, in the case of hard handoff or the like, the source base station is the base station currently in active communication with the wireless unit (e.g., in terms of transferring user data to the wireless unit), and the target base station is the base station to which communications with the wireless unit will be transferred due to movement of the wireless unit or otherwise. The algorithm is designed mainly for soft handoff only.

Since the wireless network 10 is a general-purpose communication network used by the public, it is desirable to provide a means for users to easily communicate with emergency service providers such as police, fire, and ambulance. For this purpose, the wireless network 10 is provided with the geo-location emergency service system 12. The geo-location emergency service system 12 is a computer/software (or similar) module or system interfaced with network for performing the following functions, among others: (i) routing communications between a wireless unit 20 and emergency service providers (e.g., a dispatch call center such as used in the PSTN "911" system) at a designated emergency phone number, and (ii) automatically providing location information 24 to the emergency service providers. For example, the geo-location emergency service system 12 may be a wireless enhanced 911 system, which allows a wireless unit to be located geographically using some form of network-based radiolocation, or by sourcing information from GPS functionality built into the wireless unit.

The method of the present invention supports network-based radiolocation methods, such as triangulation between base station radio towers, where the location of a wireless unit 20 is determined by correlating the distance between it and two or more base stations 16, 18. In particular, if the network is aware of the signal propagation delay between a wireless unit 20 and a first base station 16, then the distance between the two is determinable as:

Distance=(Rate of signal travel)·(Propagation delay)

Here, the propagation delay value can be determined at each base station using standard methods, and the rate of signal travel is a constant (or otherwise known) in the network. Once the distances between the wireless unit 20 and a plurality of base stations 16, 18 is known, the location 24 of the wireless unit 20 can be determined using standard methods, e.g., through triangulation or the like, as a function of the distances and the locations of the base stations:

Location of wireless unit=$f${(distance 1, location 1), (distance 2, location 2) . . . , (distance "$n$", location "$n$")}

Thus, when a wireless unit 20 initiates an emergency services communication 22 through a source base station 16, to a dedicated emergency phone number or otherwise, either the source base station 16 or the emergency service system 12 determines if location, information 24 is already available for the wireless unit, e.g., through GPS information provided in the communication 22. If not, and if the wireless unit 20 is GPS enabled, then the wireless unit 20 is polled for its location as determined through the wireless unit's GPS functionality. If the wireless unit 20 is not GPS enabled, or if GPS information cannot be obtained from the wireless unit, then the network 10 attempts to determine the location of the wireless unit using the network infrastructure, e.g., base station triangulation. To do so, the network obtains propagation delay information from a number of base stations 16, 18. As part of this process, the source base station 16 sends propagation delay measurement request messages 14 to one or more target base stations 18 in the active set of the wireless unit, or to target base stations that are otherwise associated with the wireless unit for handoff purposes. The request message identifies the wireless unit for which propagation delay information is requested, as well as a return address (or the like) for the target base stations 18 to communicate with the source base station 16. Other information may be included in the request messages 14, which are described in more detail below.

Once the request messages 14 are received at the target base stations 18 to which they are transmitted, each base station 18 determines the signal propagation delay of the wireless unit 20 (e.g., the CDMA serving one-way delay in units of ⅛$^{th}$ PN chip), using standard methods. This information 28 is included in a propagation delay measurement report message 26 that is transmitted by the target base station 18 back to the source base station 16. Alternatively, if the target base station 18 carries out regular calculations of wireless unit propagation delay, then the latest such information can be included in the report message 26. In either case, the report message 26 includes the propagation delay information 28, the identity of the wireless unit 20, and the identity of the target base station 18, among other possible information. Subsequent to being received at the source base station 16, the information in the report messages 26 is used to determine the distance between the wireless unit and each target base station. (A similar calculation may be carried out in regards to the source base station.) Since each base station location is known and fixed, the distance information can be used to triangulate the wireless unit's geographic location 24, using standard methods. This information is passed on to the emergency service system 12. (Alternatively, location calculations can be carried out at or by the emergency service system 12, or by another network entity.)

The report messages 26 may be configured to include a time stamp 62 relating to when the propagation delay was determined, to when the messages are transmitted, or otherwise. In the case of the former, the time stamp may indicate the time that the CDMA serving one-way delay of the wireless unit in question was measured at the target base station, with a resolution of 20 ms. Such time stamp data may be required for the particular geo-location method utilized in the network 10 for locating wireless units 20.

In the original CDMA2000® specification (e.g., as defined in the "TIA/EIA Interim Standard, Interoperability Specification (IOS) for cdma2000 Access Network Interfaces, Release B" (TIA/EIA/IS-2001, May 2002), hereby incorporated by reference in its entirety and available for viewing at www.tiaonline.org), propagation delay measurement report messages are specified as being automatically sent from a target base station to a source base station immediately following the target base station's acquisition of a wireless unit and subsequently whenever the propagation delay of the wireless unit, as measured at the target base station, changes by two or more PN chips. In a network configured according to the present invention, however, the functionality of target base stations automatically transmitting propagation delay information to source base stations is removed. This is because such automatic transmissions unnecessarily increase network traffic load, considering that most vendor systems do not otherwise use or require the propagation delay information. Instead, according to the present invention, propagation delay measurement report messages are sent from target base stations to source base stations only when requested, by way of the source base stations transmitting propagation delay measurement request messages to the target base stations.

FIGS. 3A-3C show one possible format for the propagation delay measurement request messages 14, which can be directly incorporated into the TIA/EIA standard noted above as a new message format. In these figures, "SDU" refers to the source base station, "BTS" to the target base station, "M" is information elements which are mandatory for the message, "O" is information elements which are optional for the message, "R" is required in the message whenever the message is sent, and "C" means conditionally required. Section references are to the TIA/EIA standard.

FIG. 3A shows the information elements that are included in the propagation delay measurement request messages 14. These include a "Message Type II" element 64, which is used to indicate the type of a message on the A3 and A7 interfaces, a "Call Connection Reference" element 66, which contains a globally unique identification for a call connection, a "Correlation ID" element 68, which is used to correlate request and response messages, and a "Propagation Delay Request Record" element 70. If the "Correlation ID" element 68 is included in the message 14, then this element is returned in the corresponding propagation delay measurement report message 26.

FIG. 3B shows the bitmap layout for the propagation delay measurement request message 14. The message includes the "Message Type II" element 64, the "Call Connection Reference" element 66, and the "Propagation Delay Request Record" element 70, which are formatted as indicated. The layout of the "Propagation Delay Request Record" element 70 is shown in more detail in FIG. 3C. Here, a "Length" field 72 indicates the number of octets in this element that follow the "Length" field 72. A "Call Identification Discriminator" field 74 utilizes the same "Cell Identification Discriminator" values that are used in conjunction with the "Cell Identifier" element (see, e.g., section 4.2.5 of the TIA/EIA standard) to describe the format of the immediately following "Cell_ID." Cell discriminator type "0000 0111" is used. (As explained in the TIA/EIA standard, the "Cell Identifier" element uniquely identifies a particular cell. It includes a "Cell Identification Discriminator," which is a binary number indicating if the whole or a part of the Cell Global Identification (e.g., one or more of the following: MCC, MNC, LAC, MSCID, CI) is used for cell identification. A cell discriminator type "0000 0111" indicates that IS-41 whole Cell Global Identification (ICGI) is used to identify the cell.) Finally, a "Cell Identification" field 76 is the cell identification as described in section 4.2.5 of the TIA/EIA standard for which the propagation delay measurement is included in this record. It is formatted according to octets 4 through the end of the "Cell Identifier" element defined in section 4.2.5.

FIGS. 4A-4C show one possible format for the propagation delay measurement report messages 26. The report message format as shown in FIGS. 4A-4C replaces the propagation delay measurement report defined in section 3.1.6 of the TIA/EIA standard. FIG. 4A shows the information elements that are included in the propagation delay measurement report messages 26. These include a "Message Type II" element 78, a "Call Connection Reference" element 80, and a "Correlation ID" element 82, which are similar to the corresponding elements described above in regards to FIG. 3A. (Note that the "Correlation ID" is included only if it was included in the request message.) The report message 26 also includes a "One Way Propagation Delay Record" element 84, which carries the "One Way Propagation Delay Record" of only one target base station.

FIG. 4B shows the bitmap layout for the propagation delay measurement report message 26. The message includes the "Message Type II" element 78, the "Call Connection Reference" element 80, and the "One Way Propagation Delay Record" element 84, which are formatted as indicated. Note that the "One Way Propagation Delay Record" element 84 includes the propagation delay information 28, e.g., the CDMA serving one-way delay of the wireless unit as measured at the target base station, recorded as a multiple of $\frac{1}{8}^{th}$ PN chips, and the delay time stamp 62.

The layout of the "One Way Propagation Delay Record" 84 is shown in more detail in FIG. 4C. This record 84 includes a "Length" field 86, a "Cell Identification Discriminator" field 88, one or more "Cell Identification" fields 90, the CDMA serving one-way propagation delay 28, and the CDMA serving one-way propagation delay time stamp 62. The "Length" field 86 indicates the number of octets in this element following the "Length" field. The "Cell Identification Discriminator" field 88 and the "Cell Identification" field 90 are similar to the corresponding elements described above in regards to FIG. 3C. The CDMA serving one-way propagation delay 28, as indicated above, is the CDMA serving one-way delay of the wireless unit 20 as measured at the target base station 18, recorded as a multiple of $\frac{1}{8}^{th}$ PN chips. The CDMA serving one-way propagation delay time stamp 62 is a 16 bit binary number indicating the time that the CDMA serving one-way delay was measured, with a resolution of 20 ms.

Although the request messages 14 and report messages 26 have been described above in terms of a particular message formatting, e.g., as shown in FIGS. 3A-4C, other formats are possible without departing from the spirit and scope of the invention.

In the network 10, base stations may be configured to utilize a "$T_{prop}$" timer 92 as part of the process for sending request messages 14 and receiving report messages 26. The timer 92 is used by a source base station 16 to wait for a report message 26 from a target base station 18. The timer 92 is started when a request message 14 is transmitted by the source base station 16 to the target base station 18, and stopped when a corresponding report message 26 is received from the target base station 18. The default value of the timer is 0.5 seconds, with a range of 0 to 1 seconds, and a granularity of 0.1 seconds. If a report message 26 is not received by the source base station from the target base station before the timer 92 expires, then the source base station may re-transmit the request message 14, report that the propagation delay information is unavailable, or take other appropriate action.

Although the wireless unit signal propagation delay information has been illustrated herein primarily for use in the context of geo-location emergency services, the delay information may be used for other purposes, for determining the location of a wireless unit or otherwise, without departing from the spirit and scope of the invention.

As should be appreciated, the method of the present invention augments the 3GPP2 inter-vendor soft handoff standard to support geo-location emergency services during inter-vendor soft handoff. Hitherto, the standard has not had a mechanism for the source base station of one vendor to request a wireless unit's propagation delay measurement from a target base station of another vendor any time when geo-location emergency services are needed. Thus, during inter-vendor soft handoff, the portion of the network operated by one vendor is unaware of the status of the wireless unit in regards to the portion of the network operated by the other vendor. This results in poor performance or even malfunctioning of the geo-location emergency services for a prolonged time period. The solution described herein adds a new inter-vendor message to the network, namely, the propagation delay measurement request message 14, for the source base station of one vendor to request a wireless unit's propagation delay measurement from a target base station of another vendor, at any time when geo-location emergency services are needed. A modification of the propagation delay measurement report message 26 is also used to support the new the propagation delay measurement request message.

Since certain changes may be made in the above-described signaling method to support geo-location emergency services, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A base station for communicating with a plurality of mobile wireless units in a wireless network, said base station comprising:
   a module configured to generate propagation delay information about one of said wireless units for use when said base station is a target base station in a handoff situation; and
   a module configured to generate and transmit a request message to a further base station for propagation delay information about one of said wireless units when the further base station is a target base station in a handoff situation;
   wherein the propagation delay information-generating module is configured to generate a propagation delay information report message of the wireless unit, said propagation delay information report message including the propagation delay information generated by the propagation delay information-generating module, and transmit said report message to a source base station only upon the receipt of the request message from the source base station requesting the propagation delay information.

2. The base station of claim 1, wherein the propagation delay information includes a one-way transmission delay of the wireless unit as measured by the base station.

3. The base station of claim 2 wherein the report message includes a time stamp relating to when the propagation delay information was generated by the base station.

4. The base station of claim 2 wherein said base station is configured to handoff mobile wireless units to target base stations that are operated by vendors different from the base station's vendor.

5. The base station of claim 4 wherein the report message includes a time stamp relating to when the propagation delay information was determined by the target base station.

6. The base station of claim 1, wherein the base station is configured to transmit propagation delay information of wireless units in communication with the target base station only upon receiving request messages requesting the propagation delay information from source base stations; and wherein the base station is configured to transmit said requested propagation delay information to source base stations that belong to at least one wireless network different from the base station's network.

7. The base station of claim 1, wherein said base station is configured to handoff mobile wireless units to target base stations that are operated by vendors different from the base station's vendor.

8. The base station of claim 1, wherein propagation delay information of wireless units in the network is transmitted only upon the receipt of request messages requesting the propagation delay information.

9. The base station of claim 1, wherein:
   the request message is transmitted to the further base station upon initiation of an emergency service communication by the wireless unit.

10. The base station of claim 9, further comprising:
for measuring a time interval from transmission of the request message to the further base station, to receipt of the report message from the further base station.

11. The base station of claim 9, wherein:
the propagation delay information includes a one-way transmission delay of the wireless unit as measured at the base station; and
the report message includes a time stamp relating to when the propagation delay information was generated by the base station.

12. The base station of claim 9, wherein:
the report message generated and transmitted by the propagation delay information-generating module can be utilized for a geo-location emergency service in the wireless network.

13. The base station of claim 1, further comprising:
for measuring a time interval from transmission of the request message to the further base station, to receipt of the report message from the further base station.

14. The base station of claim 13, wherein:
the base station compiles the delay time interval measured by the timer along with one or more received report messages for triangulating the position of the wireless unit.

15. The base station of claim 1, wherein:
the propagation delay information includes a one-way transmission delay of the wireless unit as measured at the base station; and
the report message includes a time stamp relating to when the propagation delay information was generated by the base station.

16. The base station of claim 1, wherein the request message-generating and transmitting module transmits the request message to the further base station when requested to do so by a mobile station.

17. A base station for communicating with at least one mobile wireless unit capable of generating and transmitting an emergency service communication in a wireless network, said base station comprising:
a module configured to measure a one-way transmission delay of the wireless unit;
a module configured to generate propagation delay information about said wireless unit for use when said base station is a target base station associated with the wireless unit for handoff purposes, said propagation delay information including the one-way transmission delay value measured by said base station; and
a module configured to generate and transmit a request message to a further base station for propagation delay information about said wireless unit upon transmission of the emergency service communication from the wireless unit when the further base station is a target base station associated with the wireless unit for handoff purposes;
wherein the propagation delay information-generating module is configured to generate a propagation delay information report message of the wireless unit, and transmit said report message to a source base station for use in geo-location emergency service only upon the receipt of the request message from the source base station requesting the propagation delay information.

18. The base station of claim 17, further comprising:
for measuring a time interval from transmission of the request message to the further base station, to receipt of the report message from the further base station.

19. The base station of claim 17, wherein:
the report message includes a time stamp relating to when the propagation delay information was generated by the base station.

20. A first base station for communicating with a plurality of mobile wireless units in a wireless network, said first base station comprising:
a module configured to generate propagation delay information about one of said wireless units for use when said first base station is a target base station in a handoff situation;
a module to be activated when said first base station has been designated as a target base station, said module being configured to generate a report message containing said propagation delay information generated by the propagation delay information-generating module when so activated, said module further being configured to transmit said report message to a source base station in response to a request message received from the source base station; and
a module to be activated when said first base station has been designated a source base station in a handoff situation, said module being configured to identify a further base station as a target base station in the handoff situation when so activated, and in response to such an identification, said module further being configured to generate and transmit a request message to said further base station for propagation delay information about one of said wireless units.

21. The first base station of claim 20, further comprising:
a module to be activated after said first base station generates and transmits a request message as a source base station, said module being configured to receive a report message containing propagation delay information from the further base station, and
in response to said report message, said module further being configured to initiate at least one further step for handing off the mobile wireless unit from said first base station to said further base station.

22. The first base station of claim 20, wherein propagation delay information of wireless units in the network is transmitted only upon the receipt of request messages requesting the propagation delay information.

23. The first base station of claim 20 wherein said first base station is configured to handoff mobile wireless units to further base stations that are operated by vendors different from the first base station's vendor.

24. The first base station of claim 20, wherein the request message is transmitted to the further base station upon initiation of an emergency service communication by the wireless unit.

25. The first base station of claim 20, wherein the report message generated and transmitted by the propagation delay information-generating module can be utilized for a geo-location emergency service in the wireless network.

* * * * *